United States Patent [19]

Ajinkya et al.

[11] Patent Number: 5,154,898
[45] Date of Patent: Oct. 13, 1992

[54] HIGH INTERFACIAL AREA MULTIPHASE REACTOR

[75] Inventors: Milind B. Ajinkya, Mendham; Robert M. Koros, Westfield; Barry L. Tarmy, Berkeley Heights, all of N.J.

[73] Assignee: Exxon Research and Engineering Company, Florham Park, N.J.

[21] Appl. No.: 666,950

[22] Filed: Mar. 11, 1991

Related U.S. Application Data

[63] Continuation of Ser. No. 235,572, Aug. 24, 1988, abandoned.

[51] Int. Cl.$^5$ ................................................. B01F 5/10
[52] U.S. Cl. .................................... 422/227; 261/36.1; 261/77; 261/123; 422/230; 422/231; 422/234
[58] Field of Search ............... 422/230, 140, 231, 227, 422/224, 234; 261/77, 123, 36.1, DIG. 77; 435/313, 314

[56] References Cited

U.S. PATENT DOCUMENTS 3,722,679  3/1973  Logue ........................ 261/77 X
3,938,738  2/1976  Nagel et al. ..................... 239/9

Primary Examiner—Robert J. Warden
Assistant Examiner—Amalia L. Santiago
Attorney, Agent, or Firm—Joseph J. Dvorak

[57] ABSTRACT

In its simplest sense, the present invention provides a method and apparatus for improving the contacting of plural, distinct phases in a circulatory reactor containing a liquid-immersed circulation tube by injecting a stream of dispersed distinct phases together into the circulation tube of the circulatory reactor. Sufficient fluid movement will force the fluid in the reactor to circulate downwardly through the circulation tube and upwardly in the annular space between the tube and the reactor wall.

6 Claims, 1 Drawing Sheet

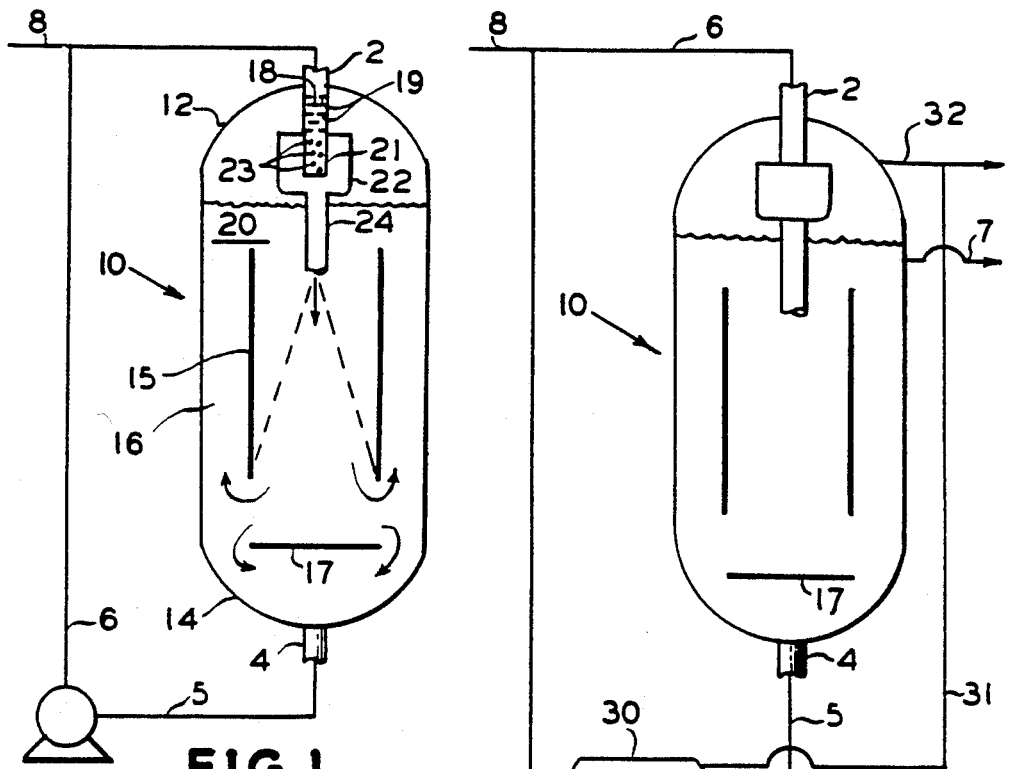
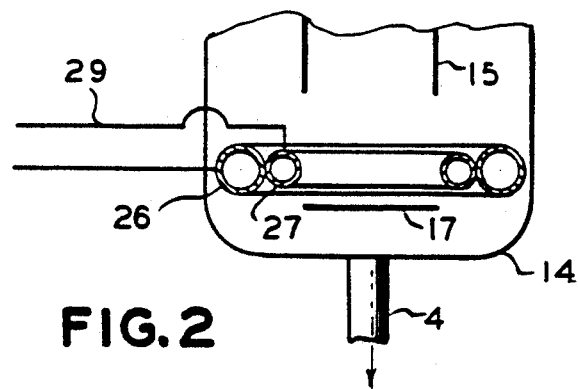
FIG.1
FIG.3
FIG.2

HIGH INTERFACIAL AREA MULTIPHASE REACTOR

This is a continuation of application Ser. No. 235,572 filed Aug. 24, 1988 now abandoned.

FIELD OF THE INVENTION

The present invention is concerned with improvements in contacting distinct, physical phases such as gases and liquids.

BACKGROUND OF THE INVENTION

There are many especially important operations in which it is necessary to physically mix plural distinct phases such as gases and liquids. Indeed, reactions between a gas and a liquid are common in the chemical industry. In such processes, it is important to maximize the interfacial area between the distinct phases so as to maximize the rate of reaction, the yield, or the like in such processes. It is an object of the present invention to provide improvements in contacting of plural, distinct phases so as to enhance or improve the physical processes based on such contacting.

Another object of the present invention is to provide improvements in absorption and reaction of olefins, either gases or liquids, by sulfuric acid in the hydration of olefins to produce alcohols.

SUMMARY OF THE INVENTION

In its simplest sense, the present invention provides a method for improving the contacting of plural, distinct phases in a reactor in which the phases are circulated and containing a liquid-immersed circulation or draft tube by injecting a stream of dispersed distinct phases together into the draft tube of the circulatory reactor. Sufficient fluid movement will force the fluid in the reactor to circulate downwardly through the circulation tube and upwardly in an annular space between the circulation tube and the outer vessel wall.

BRIEF DESCRIPTION OF THE DRAWINGS

FIG. 1 is a schematic/diagrammatic view of one embodiment of a multiphase contactor according to the invention.

FIG. 2 is a diagrammatic/schematic view of a multiphase contactor of the present invention including a circular, perforated sparger pipe located in the outer annular region in accordance with a preferred embodiment of the present invention.

FIG. 3 is a schematic view of an alternative embodiment of the invention.

DETAILED DESCRIPTION OF THE INVENTION

The present invention will be described by referring specifically to the dispersion of a gas such as propylene or butene in a liquid such as sulfuric acid. However, it should be readily appreciated that the principles and concepts described herein are equally applicable to the processes in which contacting of distinct phases is desired.

Turning now to FIG. 1, the reactor 10 is a generally cylindrical, vertically disposed vessel having sidewalls 11 and top and bottom walls 12 and 14, respectively. A circulation or draft tube 15 is centrally located within reactor 10 and defines an annular space 16 between the sidewalls 11 and the circulation tube 15. The dimensions of the circulation tube 15 can vary over a wide range, and selection of proper dimensions will depend upon a number of factors such as the ratio of the length to diameter of the reactor, the desired circulation rate and the like. In general, however, the diameter of the circulation tube 15 will generally be in the range from about 0.4 to about 0.7 times the diameter of the reactor 10.

The length of circulation tube 15 also may vary over a wide range. In general, however, the length will be from about 0.2 to 0.9 times the height of reactor 10. Circulation tube 15 is positioned within vessel 10 so that in operation the top end of circulation tube 15 will always be below the head of liquid 20, for example, sulfuric acid, contained in the reactor, and the bottom end of tube 15 will be spaced apart from the bottom wall 14 of reactor 10 by a distance greater than the diameter of circulating tube 15. For example, the distance of about one and a half to about three times the diameter of draft tube 15.

Located below the bottom of the circulating tube 15 is a baffle 17 which has a diameter that is about equal to the diameter of the circulating tube 15. The baffle is placed with respect to the bottom of the circulation tube 15 and bottom wall 14 of the vessel 10 such that the space between the vessel bottom and the outer edge of the baffle is about equal to the diameter of the circulating tube 15.

The vessel 10 is also provided with a conduit 4 for removal of liquids for recycle via lines 5 and 6. Vessel 10 is also equipped with a conduit (not shown) for removal of liquid product for delivery, for example, to a liquid product store. Line 8 is provided, which communicates with recycle line 6 and as a source as gaseous olefin (not shown) such as butenes. Thus, the olefin and sulfuric acid may be fed together via conduit 2 into the vessel. Conduit 2 contains disk and donut baffles, 18 and 19, respectively, for turning and mixing the gaseous olefin and liquid sulfuric acid as it passes through conduit 2. The mixture of gas and liquid then passes into a pipe 21 centrally positioned in a cylindrical mixing vessel 22. As can be seen, pipe 21 has a plurality of holes 23 for further mixing of the gas and liquid. The fluid then exits the mixing vessel 22 and flows into a nozzle 24 which opens below the level of liquid 20 in the reactor and within the circulating tube.

In operation then a mixture of the olefin and acid is churned and mixed by the baffles in the conduit 2 and fed through holes 23 of pipe 21 causing extremely small bubbles to be formed. The gas and liquid mixture then is emitted as a jet of fluid from nozzle 24. The jet of fluid exiting the nozzle exchanges its momentum with the fluid in the circulating tube and causes the fluid in the circulating tube to move in a downwardly direction. This movement in turn causes the entire contents of the reactor to move; namely, upward in the annulus outside the circulating tube, and downwardly through the circulating tube.

The diameter of the nozzle 24 is sized such that in the length of the draft tube enough momentum is transferred to move from three to twenty times the amount of fluid as is recycled via lines 5 and 6, and preferably five times as much. This is readily accomplished, for example, by sizing the nozzle diameter to be one twentieth of the length of the circulation tube.

The baffle 17 at the bottom of the circulating tube, of course, deflects the jet energy of the fluids exiting the circulating tube, and deflects it radially, preventing the energy from leaving through the recycle exit conduit 4.

As indicated in operation, recycle flows can be adjusted to give five turnovers within the reactor vessel or an axial liquid velocity within the reactor which is at least three times, for example, from three to five times, the buoyant rise velocity of the largest bubble in the reactor. This results in an extremely high vapor holdup of small bubbles formed by the holes 23 of pipe 21 and the nozzle 24. Furthermore, by maintaining a high recirculation rate within the reactor, bubble coalescence is be reduced with the concomitant result that the high interfacial areas are maintained.

In an alternate but particularly preferred embodiment of the present invention, ring sparger pipes 26 and 27 are located in the outer annular region of the vessel 10. Preferably the spargers are located in the annular region between the bottom of the circulation tube 15 and baffle 17. This is shown in the FIG. 2 embodiment of the present invention. In this embodiment, a portion of the gas is sparged through the annular ring sparger 26 from line 28 to aid in setting up and maintaining the flow of fluids circulating in vessel 10. Similarly, a portion of the liquid is sparged through ring spargers 28 from line 29. Indeed, it is particularly preferred that the openings in the gas spargers be substantially orthogonal to the openings in the liquid sparger as is described in greater detail in copending application Ser. No. 210,550 filed Jun. 21, 1988, now abandoned, which is incorporated herein by reference.

In general, from about five to about fifty percent of the total amount of gas fed to the reactor, and preferably about ten percent of the gas fed to the reactor, is fed in the annular region through the annular sparger 26 providing a buoyancy driving force in the outer annular zone that stabilizes the recirculating flow. Typically the volumetric ratio of gas to liquid is in the range of from about 4:1 to about 1:2.

While in the preceding discussion specific mention was made with respect to using a gas and a liquid, in other applications, such as processes involving two distinct liquid phases or two liquid and one gaseous phase, it is preferred to circulate the recycle fluid through a separator drum, particularly where a phase volume ratio enhancement or control is desired over and beyond that available by proportioning the two liquid feeds to the reactor. Thus, as is shown in FIG. 3, a separation drum 30 is interposed between lines 5 and 6. The heavier phase that separates in drum 30 is recycled via line 6 whereas the lighter phase is removed via line 31 and combined with the lighter phase removed via line 32 from the top of vessel 10. Liquid can also be removed via line 7 for delivery to a product store (not shown).

What is claimed is:

1. An apparatus for contacting of distinct fluid phase comprising:
    a cylindrical vessel having a top fluid inlet and a bottom fluid outlet;
    a circulation tube having a predetermined diameter centrally disposed in said vessel and immersed in a liquid contained therein under conditions of use;
    baffle means horizontally disposed within the vessel between said circulation tube and said bottom fluid outlet, the baffle means having a diameter equal to about the diameter of the circulation tube;
    an annular space defined between said circulation tube and said vessel;
    nozzle means extending downwardly from said top fluid inlet into said circulation tube, the nozzle means communicating with the top fluid inlet;
    a conduit providing communication between the top fluid inlet and the nozzle means, the conduit including means for generating bubbles of one distinct fluid phase in the other and
    for feeding two distinct fluid phases into said nozzle means for ejection into said circulation tube whereby said fluid phases and said liquid in said vessel flow downwardly through said circulation tube and upwardly through said annular space after being deflected by the baffle means.

2. The apparatus of claim 1 wherein said conduit providing communication between the top fluid inlet and the nozzle means is a pipe disposed within a mixing vessel, and wherein said pipe includes a plurality of orifices for generating bubbles of said distinct fluid phases.

3. The apparatus of claim 2 including baffle means in said pipe whereby said distinct fluid phases are premixed before entering said orifices.

4. The apparatus of claim 3 including means for recycling fluid from said bottom fluid outlet to said top fluid inlet.

5. The apparatus of claim 3 including means for separately introducing two distinct fluid phases in said annular space in the region of said baffle means.

6. The apparatus of claim 5 wherein said means is a double ring sparger.

* * * * *